(12) United States Patent
Hojo et al.

(10) Patent No.: US 12,431,530 B2
(45) Date of Patent: Sep. 30, 2025

(54) NONAQUEOUS ELECTROLYTE SECONDARY BATTERY

(71) Applicant: Panasonic Intellectual Property Management Co., Ltd., Osaka (JP)

(72) Inventors: Nobuhiko Hojo, Osaka Fu (JP); Yuji Tani, Osaka Fu (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 620 days.

(21) Appl. No.: 17/764,716

(22) PCT Filed: Jul. 21, 2020

(86) PCT No.: PCT/JP2020/028284
§ 371 (c)(1),
(2) Date: Mar. 29, 2022

(87) PCT Pub. No.: WO2021/065164
PCT Pub. Date: Apr. 8, 2021

(65) Prior Publication Data
US 2022/0344699 A1 Oct. 27, 2022

(30) Foreign Application Priority Data
Sep. 30, 2019 (JP) ................. 2019-179845

(51) Int. Cl.
*H01M 10/0525* (2010.01)
*H01M 10/0569* (2010.01)
*H01M 10/0587* (2010.01)

(52) U.S. Cl.
CPC ... *H01M 10/0525* (2013.01); *H01M 10/0569* (2013.01); *H01M 10/0587* (2013.01); *H01M 2300/0034* (2013.01)

(58) Field of Classification Search
CPC ......... H01M 10/0525; H01M 10/0569; H01M 10/0587; H01M 2300/0034; H01M 4/133; H01M 4/525
See application file for complete search history.

(56) References Cited

U.S. PATENT DOCUMENTS

| 2005/0058904 A1* | 3/2005 | Kano | H01M 4/364 |
| | | | 429/231.1 |
| 2018/0241086 A1 | 8/2018 | Arthur et al. | |

(Continued)

FOREIGN PATENT DOCUMENTS

| CN | 107275676 A | 10/2017 |
| CN | 108461804 A | 8/2018 |

(Continued)

OTHER PUBLICATIONS

International Search Report dated Oct. 20, 2020, issued in counterpart International Application No. PCT/JP2020/028284 (2 pages).

(Continued)

*Primary Examiner* — Aiqun Li
(74) *Attorney, Agent, or Firm* — WHDA, LLP

(57) ABSTRACT

A nonaqueous electrolyte secondary battery includes a positive electrode, a negative electrode, and a lithium ion conductive nonaqueous electrolyte, wherein the negative electrode contains graphite, an open circuit potential of the negative electrode in a fully charged state is 70 mV or less relative to lithium metal, the nonaqueous electrolyte contains a solvent, a cation, and an anion, the solvent contains a fluorine-containing cyclic carbonic acid ester, the cation includes lithium ions, and the anion includes an oxalate complex anion.

10 Claims, 1 Drawing Sheet

(56) References Cited

U.S. PATENT DOCUMENTS

2018/0277898 A1\* 9/2018 Juergen ................. C07C 69/533
2019/0096594 A1   3/2019 Tsuzuki
2019/0214640 A1\* 7/2019 Salem ................... H01M 4/134

FOREIGN PATENT DOCUMENTS

| CN | 110061291 A   | 7/2019  |
|----|---------------|---------|
| EP | 2669986 A1    | 12/2013 |
| JP | 10-321224 A   | 12/1998 |
| JP | 11-97015 A    | 4/1999  |
| JP | 2008-34334 A  | 2/2008  |
| JP | 2008-152996 A | 7/2008  |
| JP | 2008-288112 A | 11/2008 |
| WO | 2017/023409 A1| 2/2017  |

OTHER PUBLICATIONS

The Extended European Search Report dated Mar. 14, 2023, issued in counterpart EP Application No. 20872105.0. (9 pages).

Office Action dated Sep. 29, 2023, issued in counterpart CN Application No. 202080068152.9, with partial English translation. (9 pages).

\* cited by examiner

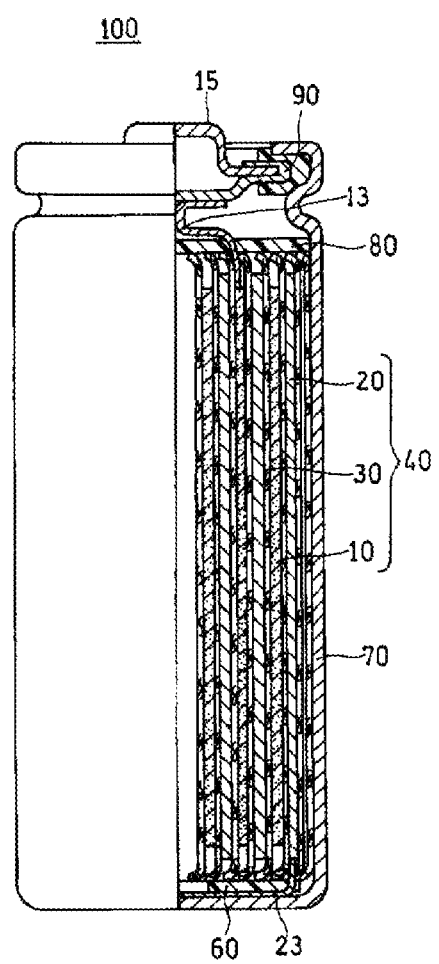

NONAQUEOUS ELECTROLYTE SECONDARY BATTERY

TECHNICAL FIELD

The present disclosure relates to a nonaqueous electrolyte secondary battery.

BACKGROUND ART

Nonaqueous electrolyte secondary batteries are used, for example, in applications for ICT such as personal computers and smart phones, in-vehicle applications, and power storage applications. In such an application, the nonaqueous electrolyte secondary battery is required to have a higher capacity. Lithium ion batteries are known as high-capacity nonaqueous electrolyte secondary batteries. However, the capacity increase of the lithium ion battery is reaching the limit.

Lithium secondary batteries are promising as high-capacity nonaqueous electrolyte secondary batteries that exceed lithium ion batteries. In the lithium secondary battery, lithium metal deposits on the negative electrode during charging, and the lithium metal is dissolved in the nonaqueous electrolyte during discharging. The lithium secondary battery is sometimes referred to as a lithium metal secondary battery. However, in the lithium secondary battery, lithium metal is easily deposited in a dendritic state on the negative electrode during charging, and the discharge capacity tends to deteriorate with the charge and discharge cycle.

Therefore, Patent Literature 1 proposes a secondary battery in which a negative electrode includes a component that exerts a capacity due to absorption and desorption of lithium, and a component that exerts a capacity due to deposition and dissolution of lithium metal, and the capacity is represented by a sum thereof. In this battery, a carbon material capable of absorbing and releasing lithium ions is used for the negative electrode, and lithium metal is deposited on the surface of the carbon material during charging.

CITATION LIST

Patent Literature

PLT 1: Japanese Laid-Open Patent Publication No. 2008-152996

SUMMARY OF INVENTION

It is difficult to deposit lithium metal in a good state on the surface of the carbon material capable of absorbing and desorbing lithium, and the improvement of the cycle characteristics of the secondary battery is limited.

One aspect of the present disclosure relates to a nonaqueous electrolyte secondary battery including a positive electrode, a negative electrode, and a lithium ion conductive nonaqueous electrolyte, wherein the negative electrode contains a carbon material for absorbing and releasing lithium ions; the open circuit potential of the negative electrode in a fully charged state is 70 mV or less relative to lithium metal; the nonaqueous electrolyte contains a solvent, a cation, and an anion; the solvent contains a fluorine-containing cyclic carbonic acid ester; the cation includes lithium ions; and the anion includes an oxalate complex anion.

Advantageous Effect

The cycle characteristics of the nonaqueous electrolyte secondary battery are improved.

BRIEF DESCRIPTION OF DRAWING

FIG. 1 is a vertical cross-sectional view schematically showing a nonaqueous electrolyte secondary battery according to an embodiment of the present disclosure.

DESCRIPTION OF EMBODIMENTS

A lithium secondary battery according to an embodiment of the present disclosure includes a positive electrode, a negative electrode, and a lithium ion conductive nonaqueous electrolyte. The negative electrode includes a carbon material that absorbs and releases lithium ions. The negative electrode exerts a capacity by absorption and release of lithium ions relative to the carbon material. Also, in a fully charged state, the open-circuit potential of the negative electrode ((CV: Open Circuit Voltage) is 70 mV or less relative to lithium metal. Since lithium metal is deposited in the negative electrode having an OCV of 70 mV or less relative to lithium metal, lithium metal is present on the surface of the carbon material in a frilly charged state. That is, the negative electrode also exerts a capacity by deposition and dissolution of lithium metal.

"Fully charged" means when the rated capacity of the battery is regarded as C, a battery is charged until, for example, its state of charge (SOC: State of Charge) becomes 0.98×C or more. The OCV of the negative electrode in a fully charged state may be measured by decomposing the battery in a fully charged state in an argon atmosphere to take out the negative electrode, and assembling a cell using lithium metal as a counter electrode. The nonaqueous electrolyte of the cell may have the same composition as that of the nonaqueous electrolyte in the decomposed battery, and for example, a nonaqueous electrolyte used in Example 1 described later may be used as a model nonaqueous electrolyte.

The nonaqueous electrolyte includes a solvent, a cation, and an anion. The solvent includes a fluorine-containing cyclic carbonic acid ester. The cation contains lithium ions. The anion includes at least an oxalate complex anion. Here, the fluorine-containing cyclic carbonic acid ester and the oxalate complex anion cooperate to improve the deposition state of the lithium metal on the carbon material and to improve the cycle characteristics.

Specifically, when the fluorine-containing cyclic carbonic acid ester and the oxalate complex anion coexist, the fluorine-containing cyclic carbonic acid ester preferentially forms a high-quality film on the surface of the carbon material. Such a film is considered to be thin, flexible, and homogeneous. Once a film derived from the fluorine-containing cyclic carbonic acid ester is formed, the oxalate complex anion is suitably decomposed on the surface of the carbon material, and the film component derived from the oxalate complex anion is suitably deposited on the surface of the carbon material. The resulting hybrid film suppresses the deposition of dendrites and leads to a more uniform state of lithium metal deposition.

In addition, the oxalate complex anion has an action of stabilizing lithium ions in a nonaqueous electrolyte, and serves to inhibit the lithium metal from depositing locally. As a result, deposition of dendrite is further suppressed. It is believed that the oxalate complex anion easily coordinates so as to encapsulate lithium ions, to stabilize lithium ions.

With the fluorine-containing cyclic carbonic acid ester alone, a sufficient effect of improving the cycle characteristics cannot be obtained, and a sufficient effect cannot be obtained even with the oxalate complex anion alone. If the oxalate complex anion alone is used, the oxalate complex anion reacts more on the surface of the carbon material, so that a thick and nonuniform film is easily formed. In such a film, it is difficult to sufficiently suppress deposition of dendrite.

Examples of the fluorine-containing cyclic carbonic acid ester include fluoroethylene carbonate (FEC), 4,5-difluoroethylene carbonate (DFEC), and trifluoropropylene carbonate. These may be used tingly, or two or more of them may be used in combination.

As the oxalate complex anion, for example, at least one selected from the group consisting of $B(C_2O_4)_2-$, $BF_2(C_2O_4)-$, $P(CO_4)_3-$, $PF_2(C_2O_4)_2-$ and $PF_4(C_2O_4)-$ may be used. It is considered that these stabilize lithium ions and greatly suppress local deposition of lithium metal. Among them, an oxalate complex anion containing fluorine is preferred. Note that the oxalate complex anion may be included in the nonaqueous electrolyte as a lithium oxalate salt (that is, a lithium salt).

The OCV of the negative electrode in a fully charged state may be less than 20 mV relative to the lithium metal. In this case, a nonaqueous electrolyte secondary battery having a higher capacity can be obtained. It can be said that a considerable amount of lithium metal is deposited in the negative electrode with an OCV of less than 20 MV relative to lithium metal. For example, in the negative electrode, when the capacity C1 exerted by absorption and release of lithium ions relative to the carbon material and the capacity C2 exerted by deposition and dissolution of lithium metal satisfy C1:C2=100:10, the OCV of the negative electrode relative to lithium metal is approximately less than 20 m. When C1:C2=100:20 is satisfied, the OCV of the negative electrode relative to lithium metal is approximately less than 5 mV. When the negative electrode contains a carbon material, the OCV of the negative electrode in a fully charged state exceeds 0 mV. The OCV of the negative electrode in a fully charged state may be 5 mV or more and 20 mV or less relative to the lithium metal. In addition, in view of obtaining a nonaqueous electrolyte secondary battery having a higher capacity the OCV of the negative electrode in a fully charged state may be 5 mV or less relative to the lithium metal, or may be approximately 0 mV.

The OCV of the negative electrode in a fully charged state may be 20 mV or more and 70 mV or less, or 20 mV or more and 50 mV or less relative to lithium metal. In this case, a nonaqueous electrolyte secondary battery having more excellent cycle characteristics can be obtained. In the negative electrode having an OCV of 20 mV or more relative to the lithium metal, not so much lithium metal is deposited, and the carbon material contributes to much of the capacity. However, even a small amount of lithium metal greatly contributes to the capacity in consideration of the capacity density of the lithium metal. Further, in view of achieving both cycle characteristics and high capacity, the OCV of the negative electrode relative to the lithium metal in a fully charged state may be greater than 0 mV and 70 mV or less, 5 mV or more and 70 mV or less.

Hereinafter, the configuration of the nonaqueous electrolyte secondary battery will be described more specifically.

[Negative Electrode]

The negative electrode includes, for example, a negative electrode mixture layer containing a negative electrode active material and a negative electrode current collector carrying a negative electrode mixture layer. The negative electrode active material includes at least a carbon material which absorbs and releases lithium ions. However, the design capacity Cn of the carbon material of the negative electrode relative to the design capacity Cp of the positive electrode may satisfy Cn/Cp<1 and Cn/Cp<0.8.

As the negative electrode current collector, for example, a metal foil can be used. As a metal composing the negative electrode current collector, a metal which does not react with lithium metal is preferable, and for example, copper (Cu), nickel (Ni), iron (Fe), and an alloy containing any of these metal elements can be used.

The negative electrode mixture layer can be formed, for example, by coating a negative electrode slurry in which a negative electrode mixture is dispersed in a dispersion medium on a surface of a negative electrode current collector and drying the slurry. The dried film may be rolled, if necessary. The negative electrode mixture layer may be formed on one surface of the negative electrode current collector, or on both surfaces thereof.

The negative electrode mixture includes a negative electrode active material as an essential component, and may include a binder, a conductive agent, a thickener, and the like as an optional component. As the binder, conductive agent, and thickener, for example, a known material can be used. Further, the negative electrode active material contains a carbon material which absorbs and releases lithium ions as an essential component.

Examples of the carbon material which absorbs and releases lithium ions include graphite, soft carbon, hard carbon, and the like. Preferred among them is graphite, which is excellent in stability during charging and discharging and has small irreversible capacity. Further, although the negative electrode active material may include a material other than the carbon material, it is preferable that 80% by mass or more (even 90% by mass or more) of the negative electrode active material is graphite.

The graphite is a carbon material having developed graphite-type crystalline structures, and may be, for example, a graphite material having a plane spacing d002 of (002) plane measured by X-ray diffractometry of 3.4 Å or less. The crystallite size of the graphite may be 100 Å or more. The crystallite size is measured, for example, by Scherrer method.

The average particle size of the carbon material that absorbs and releases lithium ions is, for example, 10 to 30 μm and may be 15 to 25 μm. When a carbon material in the above particle size range is used it is usually difficult to deposit lithium metal on the surface of the negative electrode mixture layer in a good state. On the other hand, when the fluorine-containing cyclic carbonic acid ester and the oxalate complex anion coexist in the nonaqueous electrolyte, it is possible to make the deposition state of the lithium metal good. The average particle size of the carbon material means the particle size at which cumulative volume is 50% in the particle size distribution (volume average particle size) measured by the laser diffraction scattering method.

Examples of materials other than the carbon material that can be used as the negative electrode active material include alloy-based materials. The alloy-based material is a material containing at least one kind of metal capable of forming an alloy with lithium, and includes, for example, silicon, tin, a silicon alloy, a tin alloy, a silicon compound, and the like.

As the alloy-based material, a composite material having a lithium ion conductive phase and silicon particles dispersed in the phase may be used. As the lithium ion conductive phase, a silicate phase, a silicon oxide phase in which 95% by mass or more is silicon dioxide, a carbon phase, or the like may be used.

[Positive Electrode]

The positive electrode includes a positive electrode mixture layer containing a positive electrode active material and a positive electrode current collector. The positive electrode mixture layer can be formed by coating a positive electrode slurry in which a positive electrode mixture containing a positive electrode active material, a binder, and a conductive agent is dispersed in a dispersion medium on a surface of a positive electrode current collector and drying the slurry. The dried film may be rolled, if necessary. The positive electrode mixture layer may be formed on one surface of the positive electrode current collector, or may be formed on both surfaces thereof.

As the positive electrode current collector, for example, a metal foil can be used. As a metal composing the positive electrode current collector, for example, aluminum (Al), titanium (Ti), alloys containing these metal elements, stainless steel, and the like can be used.

The positive electrode mixture includes a positive electrode active material as an essential component, and may include a binder, a conductive agent, and the like as an optional component. As the binder, conductive agent, or the like, for example, a known material can be used.

Examples of the positive electrode active material include a layered rock salt type composite oxide. For example, $Li_aCoO_2$, $Li_aNiO_2$, $Li_aMnO_2$, $Li_aCo_bM_{1-b}O_c$ (M is at least one selected from the group consisting of Na, Mg, Sc, Y, Mn, Fe, Ni, Cu, Zn, Al, Cr, Pb, Sb, and B), $LiMPO_4$ (M is at least one selected from the group consisting of Na, Mg, Sc, Y, Mn, Fe, Co, Ni, Cu, Zn, Al, Cr, Pb, Sb, and B) and the like. Here, $0<a\leq1.1$, $0\leq b\leq0.9$, and $2\leq c\leq2.3$ are satisfied. Note that the value "a" indicating the molar ratio of lithium is increased or decreased by charging and discharging.

Among them, a composite oxide of a layered rock salt type containing a nickel element is preferable. Nickel is advantageous for high capacity and low cost. Such a composite oxide is represented, for example, by the following general formula: $Li_aNi_xCo_yM_{1-x-y}O_2$. Cobalt is advantageous for extending the life of a battery.

The above general formula satisfies, for example, $0.97<a\leq1.2$, $0.5\leq x\leq1.0$, and $0\leq y\leq0.1$. In order to obtain a higher capacity, $0.8\leq x\leq1.0$ may be satisfied. Here, M is preferably at least one selected from the group consisting of Mn, Al, W, Mg, Mo, NI, Ti, Si, and Zr. Among them, it is preferable that M contains at least Al. Aluminum is advantageous in improving thermal stability. The atomic ratio Co/Al may be set between 0 and 1.0. It is to be noted that manganese, tungsten, niobium, magnesium, zirconium, and the like are considered to contribute to stabilization of the crystal structure.

The binder to be included in the positive electrode mixture and/or negative electrode mixture can be, for example, fluorocarbon resin, polyolefin resin, polyamide resin, polyimide resin, acrylic resin, vinyl resin, polyvinylpyrrolidone, polyethersulfone, rubber particles and the like. These may be used singly or in combination of two or more.

Examples of the conductive agent to be contained in the positive electrode mixture and/or the negative electrode mixture include carbon black such as acetylene black; conductive fibers such as carbon fibers and metal fibers; and carbon fluoride.

These may be used singly or in combination of two or more.

[Nonaqueous Electrolyte]

The cations and anions contained in the nonaqueous electrolyte are derived from, for example, an oxalate complex salt (hereinafter, also referred to as a first salt) and a salt other than the first salt (hereinafter, also referred to as a second salt). The second salt includes at least a lithium salt. In other words, the nonaqueous electrolyte is obtained by dissolving an oxalate complex salt (first salt) and a lithium salt (second salt) in a solvent. One of the oxalate complex salts may be used singly, or two or more kinds thereof nay be used in combination. Also, one of the lithium salts may be used singly, or two or more kinds thereof may be used in combination.

As the first salt (oxalate complex salt), a lithium oxalate salt may be used. As the lithium oxalate salt, for example, at least one selected from the group consisting of $LiB(C_2O_4)_2$, $LiBF_2(C_2O_4)$, $LiP(C_2O_4)_3 LiPF_2(C_2O_4)_2$, and $LiPF_4(C_2O_4)$ may be used.

As the second salt (lithium salt), for example, a lithium salt of a chlorine-containing acid (such as $LiClO_4 LiAlCl_4$, $LiB_{10}Cl_{10}$), a lithium salt of a fluorine-containing acid (such as $LiPF_6$, $LiPF_2O_2$, $LiBF_4$, $LiSbF_6$, $LiAsF_6$, $LiCF_3SO_3$, $LiCF_3CO_2$), a lithium halide (LiCl, LiBr, LiI), a lithium salt of a fluorine-containing acid imide, or the like can be used. Examples of the fluorine-containing imide anion include bis(fluorosulfonyl)imide anion ($N(SO_2F)_2$—) (FSI), bis(trifluoromethylsulfonyl)imide anion ($N(SO_2CF_3)_2$—) (TFST), and bis(perfluoroethylsulfonyl)imide anion ($N(SO_2C_2F_5)_2$—).

The solvent includes a fluorine-containing cyclic carbonic acid ester as an essential component. The concentration of the fluorine-containing cyclic carbonic acid ester in the nonaqueous electrolyte may be, for example, 0.1% b by mass or more and 20% by mass or less, or may be 5% by mass or more and 20% by mass or less.

As an optional component other than the fluorine-containing cyclic carbonic acid ester, for example, a cyclic carbonic acid ester containing no fluorine, a chain carbonic acid ester, a cyclic carboxylic acid ester, a chain carboxylic acid ester, or the like is used. Examples of the cyclic carbonic acid ester containing no fluorine include propylene carbonate (PC), ethylene carbonate (EC), vinylene carbonate (VC), and vinyl ethylene carbonate (NEC). Examples of the chain carbonic acid ester include diethyl carbonate (DEC), ethyl methyl carbonate (EMC), and diethyl carbonate (DMC). Examples of the cyclic carboxylic acid ester include γ-butyrolactone (GBL) and γ-valerolactone (GVL). Examples of the chain carboxylic acid ester include methyl acetate ethyl acetate, propyl acetate, methyl propionate (MP) and ethyl propionate (EP). A kind of solvent may be used singly, or two or more kinds thereof may be used in combination.

The concentration of lithium ions in the nonaqueous electrolyte may be, for example, 0.5 mol/liter or more and 3.5 mol/liter or less, 1 mol/liter or more and 2 mol/liter or less, and 1 mol/liter or more and 1.5 mol/liter or less. By setting the lithium ion concentration within the above range, a nonaqueous electrolyte having excellent ionic conductivity and suitable viscosity can be obtained.

The concentration of the oxalate complex anion in the nonaqueous electrolyte may be, for example, 0.8% by mass or more and 4.0% by mass or less, 10% by mass or more and 3.0% by mass or less, and 1.3% by mass or more and 2% by mass or less. In this case, in addition to improving the cycle characteristics, gas generation due to decomposition of the oxalate complex anion is remarkably suppressed, and also, a nonaqueous electrolyte having excellent ionic conductivity and a suitable viscosity is easily obtained.

In view of obtaining a nonaqueous electrolyte having better lithium ion conductivity, for example, when the nonaqueous electrolyte contains $LiPF_6$ as a lithium salt, the ratio of the oxalate complex anion content to the $PF_6^-$ ion content in the nonaqueous electrolyte on a molar basis may be set to 0.1 or more and 0.5 or less.

In addition, in view of improving the deposition condition of the lithium metal via the carbon material and remarkably improving the cycle characteristics, the mass ratio of the fluorine-containing cyclic carbonic acid ester to the oxalate complex salt in the nonaqueous electrolyte may be 0.025 or more, may be 0.25 or more, and may be 1.25 or more.

The mass ratio of the fluorine-containing cyclic carbonic acid ester to the oxalate complex salt in the nonaqueous electrolyte may be set to 25 or less.

In other words, the ratio of the fluorine-containing cyclic carbonic acid ester content to the oxalate complex anion content in the nonaqueous electrolyte on a molar basis may be set to 0.02 or more (further, 0.2 or more), and from another viewpoint, the ratio may be set to 13 or less.

The content of cations, anions, and various solvents in the nonaqueous electrolyte can be measured, for example, by using NMR, ion chromatography, or the like.

The nonaqueous electrolyte may be a liquid electrolyte or a gel. The gel nonaqueous electrolyte includes a liquid electrolyte and a matrix polymer. Examples of the matrix polymer include fluororesin, acrylic resin, and polyether resin.

[Separator]

A separator may be interposed between the positive electrode and the negative electrode. The separator is excellent in ion permeability and has suitable mechanical strength and electrically insulating properties. The separator may be, for example, a microporous thin film, a woven fabric, or a nonwoven fabric. The separator is preferably made of, for example, polyolefin, such as polypropylene and polyethylene.

[Nonaqueous Electrolyte Secondary Batteries]

The type and shape of the nonaqueous electrolyte secondary battery are not particularly limited. For example, the shape can be appropriately selected from various shapes such as cylindrical, coin-shaped, prism-shaped, sheet-shaped, and flat. The form of the electrode group is not particularly limited, and may be, for example, a wound type, a stack type, or the like.

As an example. FIG. 1 shows a longitudinal cross-sectional view of a cylindrical nonaqueous electrolyte secondary battery. The nonaqueous electrolyte secondary battery 100 includes a wound electrode group 40 and a nonaqueous electrolyte (not shown). The electrode group 40 includes a positive electrode 10, a negative electrode 20, and a separator 30, each having a strip shape. A positive electrode lead 13 is connected to the positive electrode 10, and a negative electrode lead 23 is connected to the negative electrode 20. One end portion in the length direction of the positive lead 13 is connected to the positive electrode 10, and the other end thereof is connected to a sealing plate 90. The sealing plate 90 includes a positive electrode terminal 15. One end of the negative electrode lead 23 is connected to the negative electrode 20 and the other end thereof is connected to the bottom of a battery case 70 serving as a negative electrode terminal. The battery case (battery can) 70 is made of metal, for example, formed of iron. To the top and bottom of the electrode group 40, a resin upper insulating ring 80 and a resin lower insulating ring 60 are disposed, respectively. In the illustrated example, a cylindrical battery having a wound-type electrode group has been described, but the present embodiment can be applied without being limited to this case.

The present invention will be described in detail below with reference to Examples and Comparative Examples. The present invention, however, is not limited to the following Examples.

Comparative Example 1, Examples 1 and 2

(1) Preparation of Negative Electrode

Artificial graphite (average particle size: 25 μm), acetylene black, and polyvinylidene fluoride (PVdF) were mixed at a predetermined mass ratio, and N-methyl-2-pyrrolidone (NMP) was added to prepare a negative electrode slurry. Next, the negative electrode slurry was applied to a surface of electrolytic copper foil, which was the negative electrode current collector, and the coating film was dried and then rolled to form negative electrode mixture layers on both surfaces of the copper foil.

(2) Preparation of Nonaqueous Electrolyte

In a solvent containing fluoroethylene carbonate (FEC), lithium difluorooxalate borate ($LiBF_2(C_2O_4)$) (hereinafter, referred to as LiFOB) as a first salt and $LiPF_6$ as a second salt were dissolved to prepare a nonaqueous electrolyte.

The concentration of $LiPF_6$ in the nonaqueous electrolyte was set to 1.0 mol/liter.

The concentration of LiFOB in the nonaqueous electrolyte was set to 0.5 mol/liter (4% by mass).

The concentration of FEC in the nonaqueous electrolyte was set to 5% by mass.

The solvent components other than FEC were ethylene carbonate (EC) and dimethyl carbonate (DMC), and the volume ratio of EC to DMC was 30:70.

(3) Fabrication of Half Cells

The above negative electrode, a counter electrode of a sufficient amount of lithium metal foil, and the above nonaqueous electrolyte were used to obtain a half-cell A1.

Comparative Examples 2 to 4

FEC and LiFOB were not used in the preparation of the nonaqueous electrolyte. Except for the above, a half cell BI was produced in the same manner as the half cell A1.

[Evaluation 1]

The half cells were charged, allowed to stand for 20 minutes, and discharged under the following conditions in a constant temperature bath of 25° C. This set of charging and discharging was regarded as one cycle; the ratio of the charge capacity to the discharge capacity (charge and discharge efficiency) was determined; charge and discharge of 10 cycles were performed- and the charge and discharge efficiency of the 10th cycle was regarded as Rm1(%). The evaluation results are shown in Table 1.

(Charging) Constant current charging was performed until the SOCs were 100% (Comparative Example 1), 110% (Example 1), and 120% (Example 2) at 0.1 It current. Setting the charge capacity Cc when the open circuit voltage after charging is 90 mV as 100, the charge capacity Cc was 110 when the stop voltage was 20 mV, and the charge capacity Cc was 120 when the stop voltage was 5 mV.

(Discharging) Constant current discharging was performed until the cell voltage reached 1.0 V at a current of 0.1 It.

TABLE 1

|  | Battery | Cc | OCV (mV) | LiFOB (wt %) | FEC (wt %) | Rm1 (%) |
|---|---|---|---|---|---|---|
| Comp. Ex. 1 | A1 | 100 | 90 | 4 | 5 | 99.9 |
| Example 1 | A1 | 110 | 20 | 4 | 5 | 99.8 |
| Example 2 | A1 | 120 | 5 | 4 | 5 | 99.5 |
| Comp. Ex. 2 | B1 | 100 | 90 | 0 | 0 | 99.9 |
| Comp. Ex. 3 | B1 | 110 | 20 | 0 | 0 | 99.6 |
| Comp. Ex. 4 | B1 | 120 | 5 | 0 | 0 | 97.4 |

In Table 1, comparison of Comparative Example 1 with Comparative Example 2 (both Cc=100, full charge OCV 90 mV) shows, when only the carbon material contributes to the negative electrode capacity, regardless of the presence or absence of LiFOB and FEC, there is no difference in the charge/discharge efficiency (i.e., cycle characteristics), i.e., reduction of the cyclic characteristics is a particular phenomenon when the lithium metal partly contributes to the negative electrode capacity. On the other hand, when Example 1 is compared with Comparative Example 3 (both Cc=110, full charge OCV 20 mV) the charge/discharge efficiencies are improved by about 0.2% by the coexistence of LiFOB and FEC in 10th cycle. When Example 2 is compared with Comparative Example 4 (both Cc=120, fill charge OCV 5 mV), the charge/discharge efficiencies are remarkably improved (2.1%) by the coexistence of LiFOB and FEC.

Example 3

(1) Preparation of Positive Electrode

Lithium nickel composite oxide ($LiNi_{0.9}Co_{0.05}Al_{0.05}O_2$) as a positive electrode active material, acetylene black, polyvinylidene fluoride, and N-methyl-2-pyrrolidone (NMP) were mixed at a predetermined mass ratio to prepare a positive electrode slurry. Next, the positive electrode slurry was applied to the surface of aluminum foil as a positive electrode current collector, and the coating film was dried, and then rolled to form a positive electrode mixture layer on both surfaces of the aluminum foil.

(2) Preparation of Negative Electrode

The same negative electrode shiny as used in Comparative Example 1 and Examples 1 and 2 was prepared. Next, the negative electrode slurry was applied to the surface of electrolytic copper foil, which was a negative electrode current collector, and the coating film as dried and then rolled to form negative electrode mixture layers on both surfaces of the copper foil.

(3) Preparation of Nonaqueous Electrolytes

In a solvent containing FEC, LiFOB as the first salt and $LiPF_6$ as the second salt were dissolved to prepare a nonaqueous electrolyte.

The concentration of $LiPF_6$ in the nonaqueous electrolyte was set to 1.0 mol/liter.

The concentration of LiFOB in the nonaqueous electrolyte was set to 0.5 mol/liter (4% by mass).

The concentration of FEC in the nonaqueous electrolyte was set to 2% by mass.

The solvent components other than FEC were EC and DMC, and the volume ratio of EC to DMC was 30:70.

(4) Design Capacity

Assuming that the OCV of the negative electrode in a fully charged state is about 5 mV relative to the lithium metal, the ratio of the design capacity Cu of artificial graphite (carbon material) of the negative electrode to the design capacity Cp of the positive electrode: Cn/Cp was set to 100/120=0.83.

(5) Fabrication of Battery

A lead tab was attached to each electrode, and an electrode group vs produced by winding the positive electrode and the negative electrode in a spiral shape with a separator interposed so that the leads were positioned at the outermost peripheral portion. The electrode group was inserted together with a reference electrode surrounded by a separator into an exterior body made of a laminated film having aluminum foil as a barrier layer, and after vacuum drying at 105° C. for 2 hours, the electrolyte was injected to seal the opening of the exterior body, thereby obtaining a battery A10.

Example 4

A battery A11 was produced in the same manner as the battery A10, except that the concentration of LiFOB in the nonaqueous electrolyte was set to 1.6% by mass and the concentration of FEC was set to 5% by mass in the preparation of the nonaqueous electrolyte.

Example 5

A battery A12 was produced in the same manner as the battery A10, except that the concentration of FEC in the nonaqueous electrolyte was set to 5% by mass in the preparation of the nonaqueous electrolyte.

Comparative Example 5

A battery B10 was prepared in the same manner as the battery A10, except that FEC and LiFOB were not used in the preparation of the nonaqueous electrolyte.

Comparative Example 6

A battery B11 was produced in the same manner as the battery A10, except that FEC was not used in the preparation of the nonaqueous electrolyte.

Comparative Example 7

A battery B12 was produced in the same manner as the battery AI, except that LiFOB was not used and the concentration of FEC in the nonaqueous electrolyte was set to 5% by mass in the preparation of the nonaqueous electrolyte.
[Evaluation 2]

The batteries were charged, allowed to stand for 20 minutes, and discharged under the following conditions in a constant temperature bath of 25° C. This set of charging and discharging was regarded as one cycle and performed for 50 cycles, and the discharge capacity of the 50th cycle was divided by the discharge capacity of the first cycle to obtain a value of the capacity retention rate Rm2. (% The evaluation results are shown in Table 2.

(Charging) Constant current charging was performed until the battery voltage reached 4.2 V at a current of 0.3 It, then, the constant voltage charging was performed until a current value reached 0.02 It at a voltage of 4.2 V.

(Discharging) Constant current discharging was performed at a current of 0.3 It until the battery voltage reached 2.85 V.

TABLE 2

|  | Battery | LiFOB (wt %) | FEC (wt %) | Rm2 (%) |
|---|---|---|---|---|
| Example 3 | A10 | 4 | 2 | 99.5 |
| Example 4 | A11 | 1.6 | 5 | 99.9 |
| Example 5 | A12 | 4 | 5 | 100.0 |
| Comp. Ex. 5 | B10 | 0 | 0 | 97.0 |
| Comp. Ex. 6 | B11 | 4 | 0 | 97.8 |
| Comp. Ex. 7 | B12 | 0 | 5 | 98.1 |

Table 2 shows that when Example 3 was compared with Comparative Example 5, the effect of improving the cycle characteristics due to the coexistence of LiFOB and FEC was further remarkable (2.5%). Further, when Comparative Example 5 was compared with Comparative Example 6, it can be seen that, only with LiFOB, the effect of improving the cycle characteristics (0.8) was small. Further, when Comparative Example 5 was compared with Comparative Example 7, it can be seen that, although the effect of improving the cycle characteristics (1.1%) is seen only with FEC, it was not so remarkable. The sum of the effects of LiFOB and FEC was 1.9%, which was about 30% lower than the effect of the combination of LiFOB and FEC (2.5%).

Next, comparing Examples 3 to 5 shows that the larger the mass ratio of FEC to LiFOB in the nonaqueous electrolyte, the more remarkable the effect of improving the cycle characteristics, particularly when it is 1.25 or more.

INDUSTRIAL APPLICABILITY

Since the nonaqueous electrolyte secondary battery according to the present disclosure has excellent cycle characteristics, the nonaqueous electrolyte secondary battery can be used for electronic devices such as mobile phones, smart phones, tablet terminals, electric vehicles including hybrids, plug-in hybrids, household storage batteries combined with solar batteries, and the like.

REFERENCE SIGNS LIST

10 Positive electrode
13 Positive electrode lead
15 Positive electrode terminal
20 Negative electrode
23 Negative electrode lead
30 Separator
40 Electrode group
60 Lower insulation ring
70 Battery case
80 Upper insulating ring
90 Sealing plate
100 Lithium secondary battery

The invention claimed is:

1. A nonaqueous electrolyte secondary battery comprising a positive electrode, a negative electrode, and a lithium ion conductive nonaqueous electrolyte, wherein
   the negative electrode contains a carbon material that absorbs and releases lithium ions,
   the negative electrode exerts a capacity by absorption and desorption of lithium ions and a capacity by deposition and dissolution of lithium metal,
   an open circuit potential of the negative electrode in a fully charged state is less than 20 mV relative to lithium metal,
   the nonaqueous electrolyte contains a solvent, a cation, and an anion,
   the solvent contains a fluorine-containing cyclic carbonic acid ester,
   the cation includes lithium ions, and
   the anion includes an oxalate complex anion,
   a concentration of the oxalate complex anion in the nonaqueous electrolyte is 0.8% by mass or more and 4.0% by mass or less, and
   a concentration of the fluorine-containing cyclic carbonic acid ester in the nonaqueous electrolyte is 0.1% by mass or more and 20% by mass or less.

2. The nonaqueous electrolyte secondary battery according to claim 1, wherein the oxalate complex anion is at least one selected from the group consisting of $B(C_2O_4)_2^-$, $BF_2(C_2O_4)^-$, $P(C_2O_4)_3^-$, $PF_2(C_2O_4)_2^-$, and $PF_4(C_2O_4)^-$.

3. The nonaqueous electrolyte secondary battery according to claim 1, wherein the concentration of the oxalate complex anion in the nonaqueous electrolyte is 1.0% by mass or more and 4.0% by mass or less.

4. The nonaqueous electrolyte secondary battery according to claim 1, wherein the concentration of the fluorine-containing cyclic carbonic acid ester in the nonaqueous electrolyte is 2% by mass or more and 20% by mass or less.

5. The nonaqueous electrolyte secondary battery according to claim 1, wherein when the oxalate complex anion is derived from an oxalate complex salt, a mass ratio of the fluorine-containing cyclic carbonic acid ester to the oxalate complex salt in the nonaqueous electrolyte is 0.025 or more.

6. The nonaqueous electrolyte secondary battery according to claim 1, wherein
   the positive electrode contains a composite oxide represented by the following general formula: $Li_aNi_xCo_yM_{1-x-y}O_2$,
   in the general formula,
   $0.97 < a \leq 1.2$,
   $0.5 \leq x \leq 1.0$, and
   $0 \leq y \leq 0.1$ are satisfied, and
   M is at least one selected from the group consisting of Mn, Al, W, Mg, Mo, Nb, Ti, Si, and Zr.

7. The nonaqueous electrolyte secondary battery according to claim 6, wherein $0.8 \leq x \leq 1.0$ is satisfied.

8. The nonaqueous electrolyte secondary battery according to claim 6, wherein
   M includes Al, and
   an atomic ratio Co/Al is 0 to 1.0.

9. The nonaqueous electrolyte secondary battery according to claim 1, wherein the concentration of the oxalate complex anion in the nonaqueous electrolyte is 1.6% by mass or more and 4.0% by mass or less.

10. The nonaqueous electrolyte secondary battery according to claim 1, wherein the concentration of the fluorine-containing cyclic carbonic acid ester in the nonaqueous electrolyte is 2% by mass or more and 5% by mass or less.

* * * * *